US010223777B2

(12) United States Patent
Baymar

(10) Patent No.: US 10,223,777 B2
(45) Date of Patent: Mar. 5, 2019

(54) SELECTIVE MODIFICATION OF VISUAL OUTPUT DISPLAYED ON A COMPUTER SCREEN BY CANCELLING AN INITIAL MODIFICATION EFFECT

(71) Applicant: Freedom Scientific, Inc., St. Petersburg, FL (US)

(72) Inventor: Al Oleg Baymar, Nashua, NH (US)

(73) Assignee: Freedom Scientific, Inc., St. Petersburg, FL (US)

(*) Notice: Subject to any disclaimer, the term of this patent is extended or adjusted under 35 U.S.C. 154(b) by 0 days.

(21) Appl. No.: 15/420,945

(22) Filed: Jan. 31, 2017

(65) Prior Publication Data

US 2019/0019276 A1    Jan. 17, 2019

Related U.S. Application Data

(60) Provisional application No. 62/451,059, filed on Jan. 26, 2017.

(51) Int. Cl.
*G06F 17/20*    (2006.01)
*G06T 5/00*    (2006.01)
(Continued)

(52) U.S. Cl.
CPC ............. *G06T 5/009* (2013.01); *G06F 17/24* (2013.01); *G06K 9/00456* (2013.01); *G09G 5/02* (2013.01);
(Continued)

(58) Field of Classification Search
CPC ........... G06T 5/009; G06F 17/24; G09G 5/02; G09G 5/10
(Continued)

(56) References Cited

U.S. PATENT DOCUMENTS

2006/0104506 A1* 5/2006 Kim .................... G06K 9/38
382/162
2008/0172607 A1* 7/2008 Baer .................... G06F 17/2211
715/255
(Continued)

FOREIGN PATENT DOCUMENTS

WO    2013129934 A1    9/2013

OTHER PUBLICATIONS

"Deluminate," extension for Google Chrome browser, available at http://deluminate.github.io/. Accessed Mar. 27, 2017.
(Continued)

*Primary Examiner* — Stephen S Hong
*Assistant Examiner* — Hope C Sheffield
(74) *Attorney, Agent, or Firm* — Andriy Lytvyn; Smith & Hopen, P.A.

(57) ABSTRACT

A method of selectively modifying output of a computer screen. An application hosts an electronic document having a background, alphanumerical characters, and one or more images. A modification tool performs a first modification step in which the modification tool modifies color and/or brightness of all content displayed on the computer screen. The invention identifies and analyzes images within that content to determine whether each image is a real-world image, such as a photograph. A second modification step, which is opposite to the first modification step, is applied to each real-world image, thereby reversing initial modification and returning the image to original, unmodified form. The computer screen outputs the modified electronic document having a modified background and modified text, but outputs the real-world image in its original, unmodified form.

18 Claims, 4 Drawing Sheets

(51) Int. Cl.
    *G06F 17/24*     (2006.01)
    *G06K 9/00*     (2006.01)
    *G09G 5/02*     (2006.01)
    *G09G 5/10*     (2006.01)

(52) U.S. Cl.
    CPC ............ *G09G 5/10* (2013.01); *G06T 2200/24* (2013.01); *G06T 2207/10024* (2013.01); *G06T 2207/20208* (2013.01); *G06T 2207/30176* (2013.01)

(58) Field of Classification Search
    USPC ........................................................ 715/204
    See application file for complete search history.

(56) References Cited

U.S. PATENT DOCUMENTS

| | | | | |
|---|---|---|---|---|
| 2009/0002564 | A1* | 1/2009 | Barnhoefer | G09G 3/3406 348/687 |
| 2012/0236366 | A1* | 9/2012 | Imai | G06K 15/1852 358/2.1 |
| 2014/0237429 | A1* | 8/2014 | Abrahami | G06T 11/001 715/835 |
| 2014/0292820 | A1* | 10/2014 | Park | G09G 3/3208 345/690 |
| 2016/0225337 | A1* | 8/2016 | Ek | G09G 5/003 |

OTHER PUBLICATIONS

Sitecues website, available at https://sitecues.com. Accessed Mar. 27, 2017.
Extended European Search Report dated May 17, 2018 for European Patent Application No. 18153299.5 to Applicant Freedom Scientific, Inc.
Chrome's New High Contrast Extension!, May 30, 2012, https://productforums.google.com/forum/#!topic/chrome/L1gBDtmk96g, retrieved from internet on May 3, 2018.
Sarit Felicia Anais Szpiro et al., How People with Low Vision Access Computing Devices, Computers and Accessibility, Oct. 23, 2016, pp. 171-180.
OS 11's new "Smart Invert Colors" is the closest thing to Dark Mode yet | 9to5Mac, Jun. 9, 2017, https://9to5mac.com/2017/06/09/ios-11-dark-mode-smart-invert-colors-how-to-enable/, retrieved from internet on May 4, 2018.

* cited by examiner

SELECTIVE MODIFICATION OF VISUAL OUTPUT DISPLAYED ON A COMPUTER SCREEN BY CANCELLING AN INITIAL MODIFICATION EFFECT

BACKGROUND OF THE INVENTION

Field of the Invention

This invention relates to modification of visual output displayed on a computer screen. More specifically, it relates to a method of displaying modified content on a computer screen whereas real-world images are displayed in their original, unmodified form.

Background of the Invention

Computer applications and electronic documents often include dark text on a light background and images having various color characteristics. For some visually-impaired user, it may be difficult to discern conventional text and illustrations. For this reason, there is a number of software products that provide color inversion. These products are designed to modify the colors of the output of the computer screen, which helps the visually-impaired users to have improved clarity and to reduce eye strain.

One of the major disadvantages of the current software products having color/brightness modification capabilities is that the modification affects the entire area of the screen, including real-world images. Such indiscriminate application of color modification results in a serious shortcoming: when the colors of a photograph are inverted, people, animals, and real-world objects depicted in the photograph may become difficult to recognize. This flaw of the existing color inversion products is a source of frustration for many visually-impaired users and, thus, substantially undermines the benefits offered by these products.

Accordingly, what is needed is a screen magnification software that selectively applies color/modification to background, alphanumerical content, and abstract images, while displaying the real world images in their original, non-altered form.

SUMMARY OF THE INVENTION

The invention is a computer-executable method of selectively modifying colors or brightness of a computer screen output. The invention involves a step of displaying a graphic user interface (GUI) desktop and an application window displaying an electronic document. The electronic document includes a background, an alphanumerical content, and an image. The invention modifies colors and/or brightness of the GUI desktop and the electronic document thereby creating a modified graphic user interface desktop and a modified electronic document having a modified background, a modified alphanumerical content, and a modified image. The invention analyzes the electronic document to identify any images contained therein. Then, the invention analyzes the images to determine whether each image is a photograph. If the image is a photograph, the invention applies a second modification step to the modified image. The second modification step is opposite to the first modification step and, therefore, reverses the first modification step creating a final image. The final image is visually equivalent to the image in its original, unmodified form prior to the first modification step. The invention displays the modified GUI desktop and the modified electronic document having the modified background and the modified alphanumerical content. However, the final image is displayed instead of the modified image. This allows the user to see all content in modified colors that the user prefers, while seeing the photographs in their original colors.

In an embodiment, the first modification step is performed by a module external to the application hosting the electronic document. The external module obtains a copy of the modified image and applies the second modification step to the copy of the modified image to produce the final image. The final image replaces the modified image. Consequently, the modified electronic document is displayed on the computer screen with the final image instead of the modified image.

In another embodiment, the second modification step is applied to the modified image directly by the application hosting the electronic document. The application performs this modification as directed by the document processing module of the modification tool. The document processing module runs in the context of the application. In this embodiment, the application hosting the document creates a final image that is visually equivalent to the original, unmodified image.

The first and second modification steps can be an inversion of color or an inversion of brightness. The inversion of color includes a step of assigning to red, green, and blue color channels of each pixel corresponding opposite values. The inversion of brightness includes a step of assigning an opposite value of to each pixel's brightness index. The key is that the second modification step produces the exact opposite effect of the first modification step.

The determination of whether the image is a photograph may be based on an image size, an aspect ratio of the image, a file name of the image, an origin of the image, a number of different colors within the image, a pattern analysis of the image, or a combination thereof.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
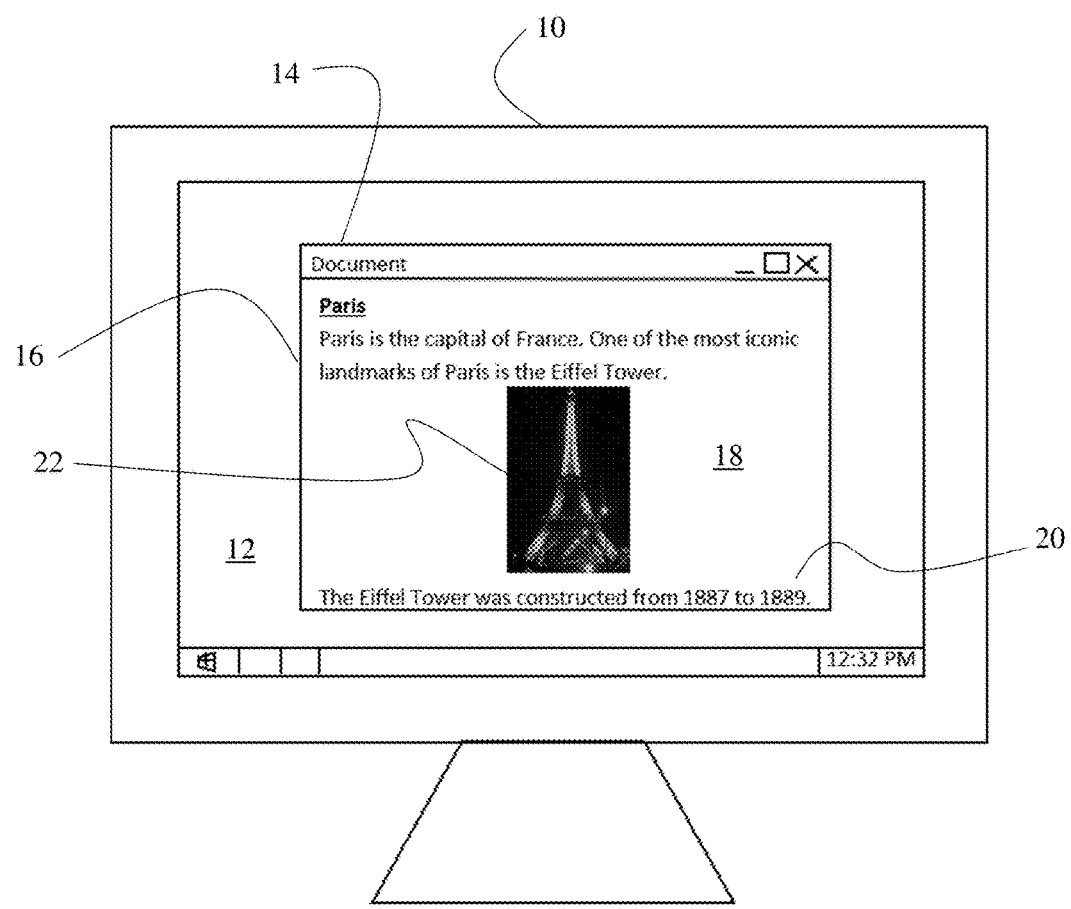
FIG. 1A is a conceptual view depicting a computer screen displaying an unmodified output.

The invention pertains to selective modification of color or brightness of the content displayed on a computer screen. FIG. 1A depicts a computer screen 10. Computer screen 10 displays a graphic user interface (GUI) desktop 12. Computer screen 10 also displays an application window 14 displaying electronic document 16. Electronic document 16 includes a background 18, text 20, and an image 22.

The conventional color scheme and brightness of the content displayed on computer screen 10 may be uncomfortable for visually-impaired users. Most electronic documents 16 have dark text 20 on a bright, light background 18. Some visually-impaired users find such scheme to inflict discomfort and strain on their eyes. These users often prefer the inverted color scheme: light colored text 20 displayed on a dark background 18.

Figure 1B:
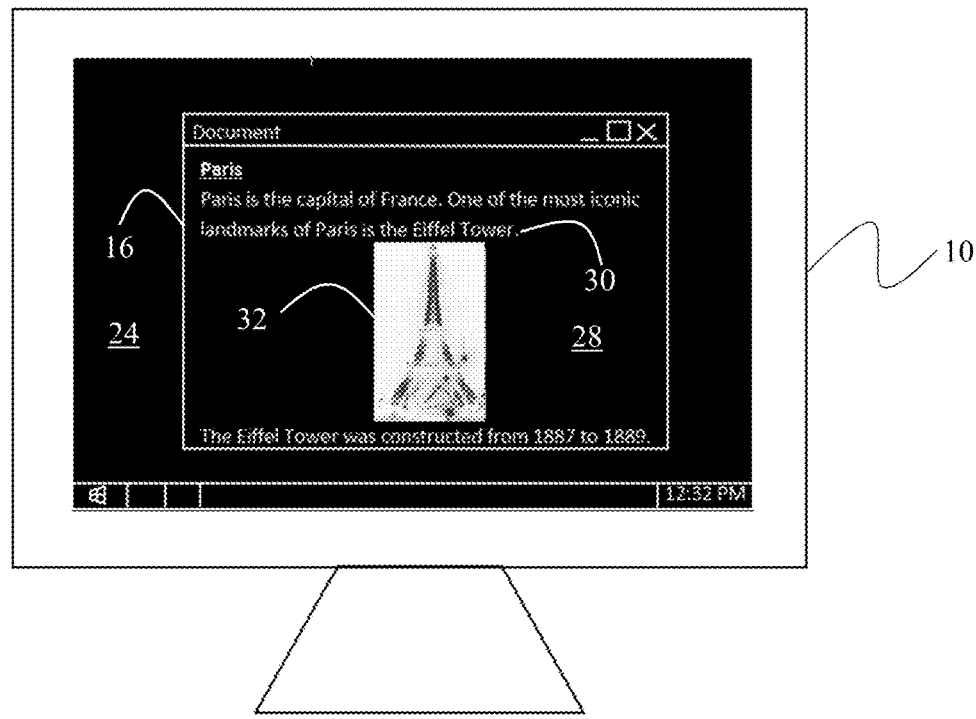
FIG. 1B is a conceptual view depicting the computer screen displaying a modified output.
Figure 1C:
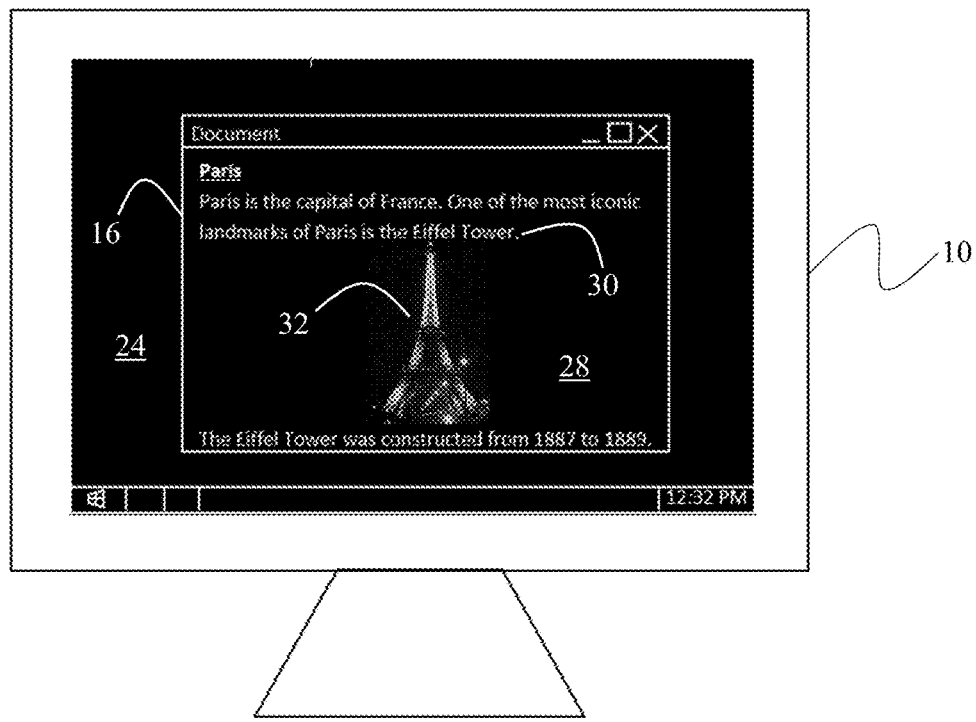
FIG. 1C is a conceptual view depicting the computer screen displaying a selectively modified output, wherein the real-world image is displayed in its unmodified form.
Figure 2:
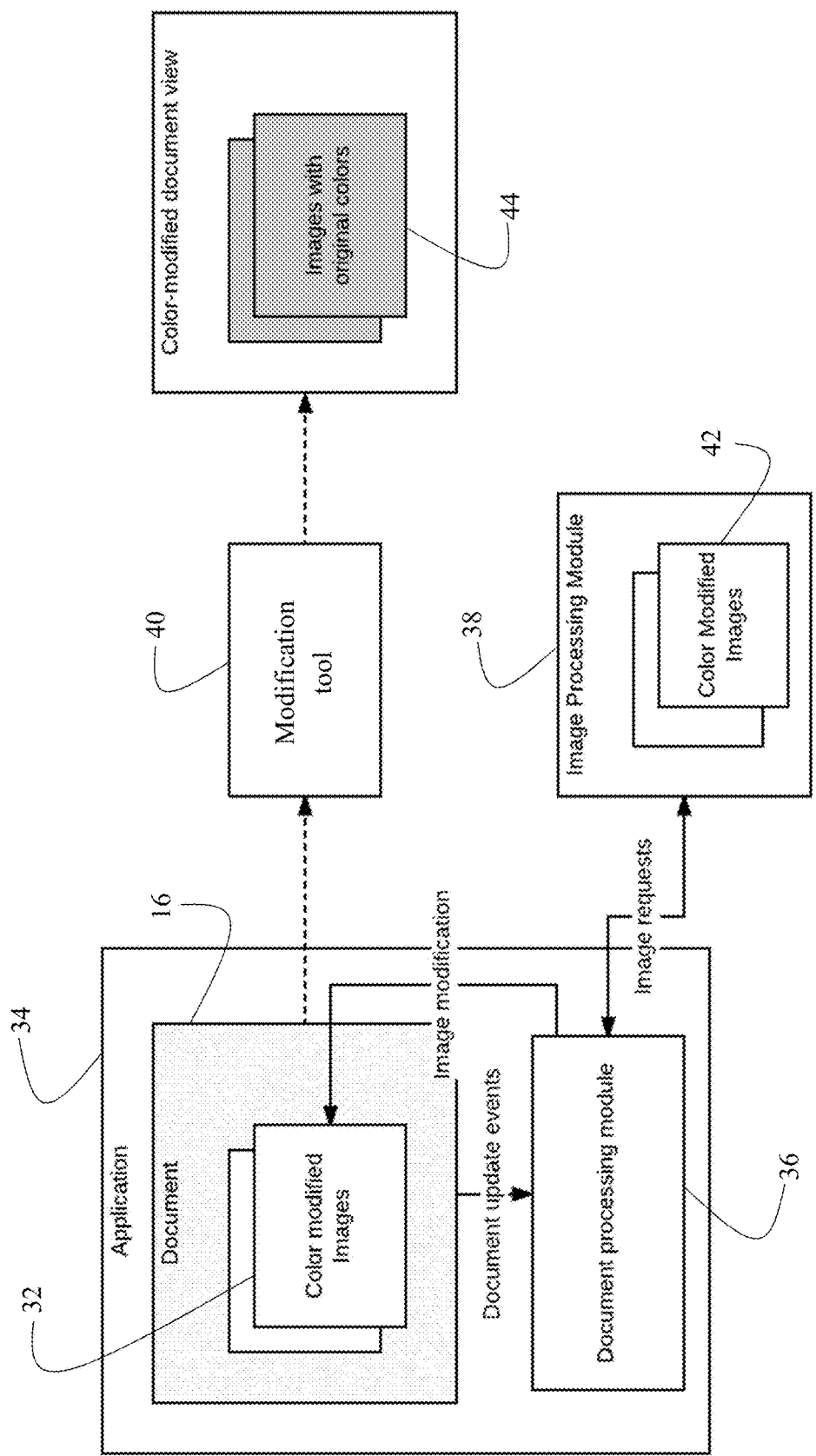
FIG. 2 is a schematic view depicting the components of the invention and their interaction with one another.

Standard screen inversion is known in the art and is illustrated in FIG. 1B. In FIG. 1B, a screen modification tool is used to invert the output of computer screen 10. FIG. 1B depicts that GUI desktop 12 and background 18, text 20, and image 22 of electronic document 16 are all displayed using the inverted colors of the original output. FIG. 1A depicts a modified GUI desktop 24 and a modified electronic document 26 having a modified background 28, modified text 30, and a modified image 32. Although such inversion may help the visually-impaired users to better discern text and icons, the inversion of real-world image 22 may alter the appearance of people, animals, and objects depicted therein to an extent where they become difficult to recognize. The present invention addresses this major flaw of the prior art by outputting modified GUI desktop 24 and modified electronic document 26 with an unmodified image 22 as depicted in FIG. 1B FIG. 2 schematically depicts the components of the invention and illustrates their interaction with one another. The invention includes computer application 34 hosting electronic document 16. A document processing module 36 runs in the context of application 34. An image processing module 38 is external to application 34 and is in communication with document processing module 36. A modification tool 40 is used to apply color and/or brightness modifications to the entire output of computer screen 10.

Modification tool 40 is deployed on the computing device coupled to computer screen 10. Modification tool 40 performs a first modification step to indiscriminately modify color and/or brightness of all visible content output on computer screen 10. If visible content includes image 22, the first modification step creates color-modified image 32. Modification tool 40 analyzes the visible output to determine whether the output includes image 22. After image 22 is identified, the modification tool performs analysis to determine whether image 22 depicts text, an abstract picture, or a real-world image. In one embodiment of the invention, when modification tool 40 determines that image 22 is a real-world image—i.e., image 22 is a photograph or another type of a rendering depicting people or real-world objects—the modification tool 40 applies a second modification step to modified image 32. The second modification step is opposite of the first modification step, thereby reversing the first modification step. The final image produced by this second modification step has the same colors and brightness as original image 22. FIG. 1B depicts the selectively modified output produced by the modification tool: computer screen 10 is displaying modified GUI desktop 24, modified background 28, modified text 30, and an unmodified image 22.

The invention works only for those modifications which are reversible—i.e. they are applied to original image 22 with no information loss and hence can be reverted with an opposite operation. Two examples of such color enhancements are the following: (1) the color of image 22 is inverted (by assigning opposite values to red, green and blue color channels of each pixel of image 22); and (2) the brightness of image 22 is inverted (by calculating the brightness index of each pixel and assigning to it the opposite value while retaining the pixel color). Because the inversion operation is applied to color channels, calculated brightness index can be presented as X=256−Y, it is possible to restore the original Y value by knowing X.

When one of these two modes is applied, modification tool 40 analyzes the content of electronic document 16 displayed in application window 14. For each identified image 22, the modification tool applies certain heuristics to decide whether the image represents text, an abstract picture, or an image of the real world (most often a photograph). The analysis takes into account the image size, aspect ratio, file name, origin, number of different colors, or a combination of these properties.

For those images 22 recognized as depicting real objects, a second color modification operation that is opposite to the first color modification operation is applied. There are at least two embodiments of the invention that can be used to accomplish this task. In the first embodiment, modification tool 40 interacts with application 34 hosting electronic document 16. Modification tool 40 instructs application 34 to perform the second modification operation on modified image 32. In the second embodiment, instead of performing the second modification step directly within application 34, an external image processing module 38 creates a copy 42 of modified image 32 and applies the second color modification to copy 42. When modified electronic document 26 is output onto computer display 10, modified image 32 is replaced with final copy 44, which is visually equivalent to original, unmodified image 22.

Modification tool 40 can use either one of these two methods depending on a runtime decision based on factors such as the image nature, its origin, current color modification mode, or when recovering from a failure while executing one method or the other.

As the result of such manipulations, images 22 of the real world object will go through color modification process twice, with one of the phases being performed by the modification tool 40 and the other phase performed by document processing module 36 internal to application 34 or by external image processing module 38. The two color modifications will cancel each other so the net effect produces final image 44 not affected by the color modification at all, whereas the rest of electronic document 16—text, document background etc.—will still have the desired colored modification.

Figure 3:
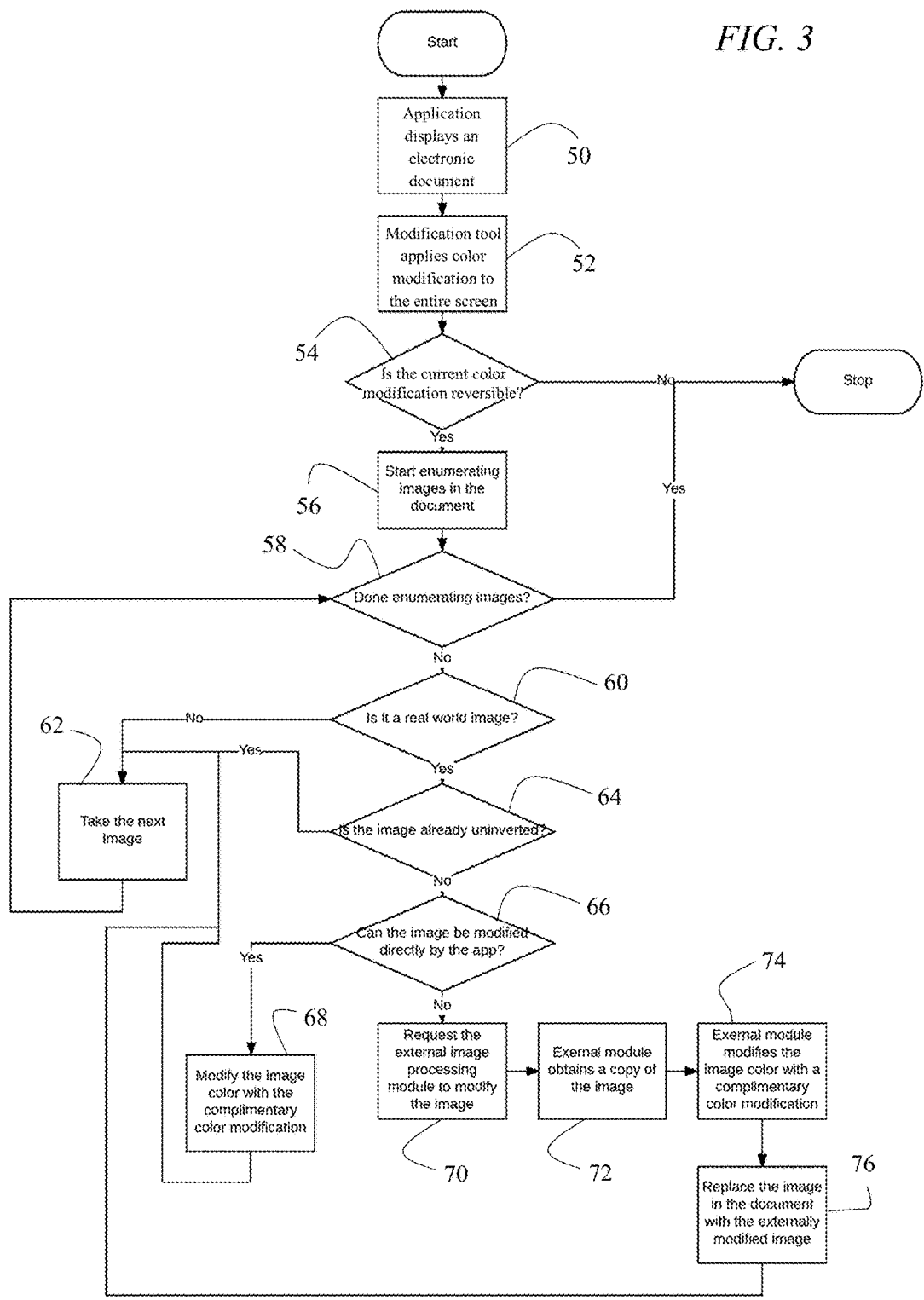
FIG. 3 is a flowchart depicting the steps of the method of selectively displaying modified content while displaying real-world images in their original, unmodified form.

FIG. 3 is a flowchart illustrating the steps of the selective visual output modification according to the present invention. In step 50 application 34 sends instructions to output electronic document 16 onto computer screen 10. In step 52, modification tool 40 intercepts those instructions and applies color/brightness modification to electronic document 16 and also to GUI background 14. In step 54, the invention analyzes whether modification applied in step 52 is reversible. If the modification is not reversible, the process ends. If the modification applied in step 52 is reversible, the invention identifies and enumerates images 22 within electronic document 16 in step 56. The invention then proceeds to a loop which begins at step 58 and is repeated for each image 22 enumerated in step 56.

In step 60, the invention determines whether image 22 is a real world image (such as a photograph). If image 22 depicts texts or an abstract drawing, the invention moves on to the next enumerated image in step 62. If, however, image 22 is a real world image, the invention proceeds to step 64, in which the invention checks whether the image is an original image 22 or modified image 32. If the image is modified image 32, the invention proceeds to step 66, in which it determines whether the second modification step can be executed within application 34. If so, in step 68, document processing module 36 applies the second modification step to modified image 32 directly within the application 34 hosting electronic document 16. Otherwise, in step 70, a request is sent to external image processing module 38 to apply the second modification step to modified image 32.

In step 72, external image processing module 38 obtains copy 42 of modified image 32. In step 74, external image processing module 38 applies the second modification step to copy 42 to create final copy 44, which is visually equivalent to original, unmodified image 22. In step 76, modified image 32 in modified electronic document 26 is replaced with final copy 44.

These steps are asynchronous, whereby images are sent to the queue and the results are provided as they are ready. The steps explained above result in an output on the computer screen 10 that includes modified GUI desktop 24, modified document background 28, modified text 30, and a final image 44 that is visually equivalent to original, unmodified image 22.

Hardware and Software Infrastructure Examples

The present invention may be embodied on various computing platforms that perform actions responsive to software-based instructions and most particularly for low-vision user software. These include both traditional desktop and notebooks devices and also smartphones and tablets. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to certain statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic, Objective C, Python or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of the Claim Terms

Background (of an electronic document)—one or more colors filling the space that is not occupied by alphanumerical characters or images.

Computing device—an electronic device for storing and processing data according to instructions issued by an application or an operating system.

Computer screen—an electronic visual display that is capable of presenting electronic information in a visual form.

Electronic document—information stored in a digital form that can be accessed by an application and output onto a computer screen. Examples of electronic documents include webpages, PDF files, word processing files, electronic spreadsheet, presentation slides, etc.

Final image—the image after it has undergone two modification steps. The second modification step reverses the first modification step and, therefore, the final image is visually equivalent to the original, unmodified image.

Graphic user interface (GUI) desktop—a primary display area of a computer screen that allows users to interact with the computing device through icons and visual indicators.

Image—a set of data that, when processed by a computing device, produces a visual output on a computer screen.

Modified background—the background whose color and/or brightness have been altered from its original, unmodified form.

Modified electronic document—the electronic document having at least some content whose color and/or brightness have been altered from its original, unmodified form.

Modified GUI desktop—the GUI desktop whose color and/or brightness have been altered from its original, unmodified form.

Modified image—the image whose color and/or brightness have been altered from its original, unmodified form.

Photograph—a subcategory of an image that depicts a real-world object and was created using a camera.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of selectively modifying colors or brightness of a computer screen output, the method comprising:
   providing a computing device coupled to a computer screen;
   receiving from the computing device a first data set for outputting onto the computer screen a graphic user interface desktop and an application window displaying an electronic document, the electronic document comprising a background, an alphanumerical content, and an image, the image having original colors;
   applying a first modification step to the graphic user interface desktop and the electronic document, the first modification step modifying colors or brightness of the graphic user interface desktop and the electronic document, thereby generating a second data set corresponding to a modified graphic user interface desktop and a modified electronic document, the modified electronic document having a modified background, a modified alphanumerical content, and a modified image, wherein the modified image is visually different from the image in its original form;
   analyzing the electronic document to identify the image;
   analyzing the image to determine whether the image is a photograph without alphanumeric content;
   responsive to identifying the image as a photograph without alphanumeric content, applying a second modification step to the modified image thereby generating a third data set corresponding to a final image, the third data set being separate from the first and second data sets, wherein the second modification step cancels out visual alterations to the image imparted by the first modification step, wherein the final image is visually equivalent to the image in its original form prior to the first modification step;
   displaying the modified graphic user interface desktop and the modified electronic document having the modified background and the modified alphanumerical content; and
   displaying the final image instead of the modified image.

2. The method of claim 1, wherein the first modification step is performed by a module external to the application hosting the electronic document.

3. The method of claim 1, further comprising:
   obtaining a copy of the modified image;
   applying the second modification step to the copy of the modified image to produce the final image;
   replacing the modified image in the modified electronic document with the final image, whereby the modified electronic document is displayed on the computer screen with the final image instead of the modified image.

4. The method of claim 3, wherein the steps of obtaining the copy of the modified image and applying the second modification step thereto are executed by a module external to the application hosting the electronic document.

5. The method of claim 1, wherein the second modification step is applied to the modified image by the application hosting the electronic document.

6. The method of claim 1, wherein the first and second modification steps are selected from the group consisting of an inversion of color and an inversion of brightness.

7. The method of claim 6, wherein the inversion of color comprises a step of assigning to red, green, and blue color channels of each pixel corresponding opposite values.

8. The method of claim 6, wherein the inversion of brightness comprises a step of assigning an opposite value of to each pixel's brightness index.

9. The method of claim 1, wherein determination of whether the image is a photograph is based on an image size, an aspect ratio of the image, a file name of the image, an origin of the image, a number of different colors within the image, a pattern analysis of the image, or a combination thereof.

10. A non-transitory computer-readable medium having stored thereon computer-executable instructions that, in response to being executed by a computing device, cause the computing device to perform operations comprising:
    using a first set of data to display on a computer screen a graphic user interface desktop and an application window displaying an electronic document, the electronic document comprising a background, an alphanumerical content, and an image;
    applying a first modification step to the graphic user interface desktop and the electronic document, the first modification step modifying colors or brightness of the graphic user interface desktop and the electronic document, thereby generating a second data set corresponding to a modified graphic user interface desktop and a modified electronic document, the modified electronic document having a modified background, a modified alphanumerical content, and a modified image, wherein the modified image is visually different from the image in its original form;
    analyzing the electronic document to identify the image;
    analyzing the image to determine whether the image is a photograph without alphanumeric content;
    responsive to identifying the image as a photograph without alphanumeric content, applying a second modification step to the modified image thereby generating a third data set corresponding to a final image, the third data set being separate from the first and second data sets, wherein the second modification step cancels out visual alterations to the image imparted by the first modification step, wherein the final image is visually equivalent to the image in its original form prior to the first modification step.

11. The media of claim 10, wherein the first modification step is performed by a module image processing module external to the application hosting the electronic document.

12. The media of claim 10, further comprising:
obtaining a copy of the modified image;
applying the second modification step to the copy of the modified image to produce the final image;
replacing the modified image in the modified electronic document with the final image, whereby the modified electronic document is displayed on the computer screen with the final image instead of the modified image.

13. The media of claim 12, wherein the steps of obtaining the copy of the modified image and applying the second modification step thereto are executed by an image processing module external to the application hosting the electronic document.

14. The media of claim 10, wherein the second modification step is applied to the modified image by the application hosting the electronic document.

15. The media of claim 10, wherein the first and second modification steps are selected from the group consisting of an inversion of color and an inversion of brightness.

16. The media of claim 15, wherein the inversion of color comprises a step of assigning to red, green, and blue color channels of each pixel corresponding opposite values.

17. The media of claim 15, wherein the inversion of brightness comprises a step of assigning an opposite value of to each pixel's brightness index.

18. The media of claim 10, wherein determination of whether the image is a photograph is based on an image size, an aspect ratio of the image, a file name of the image, an origin of the image, a number of different colors within the image, a pattern analysis of the image, or a combination thereof.

* * * * *